United States Patent [19]
Smith et al.

[11] Patent Number: 5,327,171
[45] Date of Patent: Jul. 5, 1994

[54] CAMERA SYSTEM OPTICS

[75] Inventors: Steven L. Smith, Oxford; Joseph P. Mulligan, Fairfield; Gregory P. Skinger, Southbury; Robert H. Esslinger, Wilton, all of Conn.

[73] Assignee: United Parcel Service of America, Inc., Atlanta, Ga.

[21] Appl. No.: 889,037

[22] Filed: May 26, 1992

[51] Int. Cl.$^5$ .............................................. H04N 9/73
[52] U.S. Cl. .................................. 348/223; 348/241; 358/486
[58] Field of Search ................ 358/213.15, 101, 486, 358/228, 170; 348/223, 241

[56] References Cited

U.S. PATENT DOCUMENTS

| | | | |
|---|---|---|---|
| 3,899,687 | 8/1975 | Jones | 250/568 |
| 4,063,820 | 12/1977 | Borgese | 356/167 |
| 4,375,920 | 3/1983 | Wurm | 356/380 |
| 4,488,679 | 12/1984 | Bockholt et al. | 233/469 |
| 4,500,776 | 2/1985 | Laser | 235/162 |
| 4,633,314 | 12/1986 | Kurata et al. | 358/213.15 |
| 4,766,300 | 8/1988 | Chadima, Jr. et al. | 235/472 |
| 4,896,029 | 1/1990 | Chandler et al. | 235/494 |
| 4,954,897 | 9/1990 | Ejima et al. | 358/228 |
| 4,958,064 | 9/1990 | Kirkpatrick | 235/384 |
| 5,032,712 | 7/1991 | Ito | 358/486 |
| 5,212,569 | 5/1993 | Takada | 358/486 |

FOREIGN PATENT DOCUMENTS

| | | |
|---|---|---|
| 052400A | 5/1982 | European Pat. Off. . |
| 0524029A2 | 1/1993 | European Pat. Off. . |
| 3240081 | 5/1984 | Fed. Rep. of Germany . |
| 290383A | 3/1990 | Japan . |
| 1416177 | 12/1975 | United Kingdom . |

Primary Examiner—Joseph Mancuso
Assistant Examiner—Wendy R. Greening
Attorney, Agent, or Firm—James A. Drobile; William H. Murray; Daniel H. Golub

[57] ABSTRACT

The camera system of the present invention simultaneously searches for a number of differing optical acquisition targets. This system may decode, for example, both bar codes and concentric rings. The scan signal is constantly adjusted according to both a dark reference for correcting offset and a white reference for correcting gain. The gain is also corrected according to the scanning rate as well as the amount of illumination present. A measure of this illumination may be applied directly to the optical scanning device by way of a fiber optic cable which transmits light from the illumination source. Optical calibration is eliminated by fixed optics wherein all optical elements are rigidly mounted at very close tolerances. The illumination source is disposed on one focus of an ellipse wherein the other focus is disposed at the maximum scanning distance and the reflector is formed to define the illumination ellipse to maximize the light applied to the object. The various heat producing elements are disposed in sealed compartments which are cooled by forced air which is circulated through a heat exchanger. A real time focusing system is provided wherein the distance from the scanning device to an opposing surface is constantly monitored and the system is constantly focused according to the distance.

22 Claims, 9 Drawing Sheets

CAMERA SYSTEM OPTICS

BACKGROUND OF THE INVENTION

(1) Field of The Invention

This invention relates to camera systems and in particular to a camera system for optically scanning moving objects to obtain optically encoded information from the surface of the objects.

(2) Background Art

Merchandise, various component parts, letters, moving objects, containers and a whole gamut of related items being shipped or transported, frequently must be identified with information regarding origin, flight number, destination, name, price, part number and numerous other kinds of information. In other applications, the reading of encoded information printed on labels affixed to such items permits automation of sales figures and inventory as well as the operation of electronic cash registers. Other applications for such encoded labels include the automated routing and sorting of mail, parcels, baggage, and the like, and the placing of labels bearing manufacturing instructions on raw materials or component parts in a manufacturing process. Labels for these types of articles are conventionally marked with bar codes, one of which is the Universal Product Code. Numerous other bar code systems are also known in the art.

However, certain applications require the encoding of larger amounts of information on labels of increasingly smaller size. Commercially-available bar code systems sometimes lack sufficient data density to accommodate these needs. Attempts to reduce the overall size and spacing of bars in various bar code systems in order to increase data density have not solved the problem. Optical scanners having sufficient resolution to detect bar codes comprising contrasting bars spaced five nils or less apart are generally not economically feasible to manufacture because of the close tolerances inherent in the label printing process and the sophisticated optical apparatus required to resolve bit-encoded bars of these dimensions. Alternatively, to accommodate increased amounts of data, very large bar code labels have been fabricated, with the result that such labels are not compact enough to fit on small articles. Another important factor is the cost of the label medium, such as paper. A small label has smaller paper costs than a large label. This cost is an important factor in large volume operations.

Therefore, other types of codes have been investigated to overcome the problems associated with bar codes. Some alternatives to bar codes are: circular formats using radially disposed wedged-shaped coded elements, such as those disclosed in U.S. Pat. No. 3,553,438, issued to Blitz, and entitled "Mark Sensing System, or concentric black and white bit-encoded rings, such as in U.S. Pat. Nos. 3,971,917 and 3,916,160, issued to Maddox and Russo, respectively; grids of rows and columns of data-encoded squares or rectangles, such as in U.S. Pat. No. 4,286,146, entitled "Coded Label and Code Reader for the Coded Label," issued to Uno; microscopic spots disposed in cells forming a regularly spaced grid, as disclosed in U.S. Pat. No. 4,634,850, entitled "Quad Density Optical Data System", issued to Pierce; and densely packed multicolored data fields of dots or elements, such as those described in U.S. Pat. No. 4,488,679, entitled "Code and Reading System," issued to Sockholt.

These codes were satisfactory for many applications. However, some of the encoding systems described in the foregoing examples and other encoding systems known in the art still did not provide the required data density. For example the encoded circular patterns and grids of rectangular or square boxes did not provide sufficient density. Alternatively, in the case of the grids comprised of microscopic spots or multi-colored elements referred to above, such systems require special orientation and transport means, thus limiting the utility to highly controlled reading environments. A further improvement, U.S. Pat. No. 4,874,936, entitled "Hexagonal Information Encoding Article, Process and System, "issued to Chandler discloses a label for storing information-encoded hexagons which stores densely packed information and may be read at high speed in any direction. This improvement thus solves the data density problems associated with bar codes.

However, the newer encoding systems, including the encoding system taught by Chandler, are of formats which are entirely different from conventional bar codes and can not be read by conventional bar code readers. Therefore it is difficult to use the newer encoding methods which may solve the data density problems of bar codes in an environment in which bar codes are also present unless separate scanning and decoding equipment is provided for each type of code. Thus, it would be advantageous to have a single scanning and decoding device which may detect and decode different types of encoding systems when the different encoding systems are alternately disposed in the range of the optical scanning and decoding device. Additionally, when higher density codes are used higher resolution optical scanning and therefore higher levels of illumination are required. However, the very high levels of illumination are only required some of the time. Thus wasted is energy and a threat of eye injury is needlessly created during the remaining periods.

Regardless of the type of encoding system used, high quality detection is required in many applications. Modern conveyor systems may have conveyor belt widths of three to four feet over which the position of an information-encoded label may be disposed and belt speeds of five hundred feet per minute or more. They carry moving objects which may be of varying heights upon which information-encoded labels are disposed. Thus, it can be very difficult for optical decoding systems to locate and read the data encoded labels disposed on these rapidly moving objects.

These problems have led to the need for providing a simple, rapid and low-cost means of signaling the presence of a data-encoded label within the field of view of an optical scanner mounted in a manner to permit scanning the entire conveyor belt. It is known in the art to solve these problems by providing easily recognizable optical acquisition targets as part of an encoding system. For example, the system taught by Chandler uses a concentric ring acquisition target for this purpose.

Bar code systems may also be understood to provide an acquisition target. For example, it is conventional in the art of detecting bar codes to pre-detect the rectangular shape formed by the bars. In this type of system a rectangle may indicate the presence of a bar code. Conventional bar code detectors, after acquiring the rectangle, then attempt to find encoded data within the pt.-detected rectangle. If valid data is found encoded within the rectangle, the bar code is thus detected. However, many other types of rectangles within the range of the optical scanning device may cause false pre-detects in this method.

Further data arrays having acquisition targets other than the concentric rings and bar codes are known in the art. For example, concentric geometric figures other than rings, such as squares, triangles, hexagons and numerous variations thereof, are described in U.S. Pat. No. 3,513,320, issued to Weldon, on May 19, 1970, and entitled "Article Identification System Detecting Plurality of Colors Disposed on an Article" and U.S. Pat. No. 3,603,728, issued to Arimura, on Sep. 7, 1979, and entitled "Position and Direction Detecting System Using Patterns". U.S. Pat. No. 3,693,154, issued to Kubo et al., on Sep. 19, 1972, and entitled "Method For Detecting the Position and Direction of a Fine Object" and U.S. Pat. No. 3,801,775, issued to Acker, on Apr. 2, 1974, and entitled "Method and Apparatus for Identifying Objects" also describe systems using symbols comprising concentric circles as identification and position indicators, which symbols are affixed to articles to be optically scanned.

U.S. Pat. No. 3,553,438, entitled "Mark Sensing System" issued to Melvin, discloses a circular data array having a centrally-located acquisition target comprising a number of concentric circles. The acquisition target of Melvin provides an image which may be used by an optical scanning device to locate the label. The acquisition target of Melvin also permits determination of the geometric center of the label and the geometric center of the data array. This is done through logic circuitry which recognizes the pulse pattern representative of the concentric ring configuration.

The foregoing systems are generally scanned with an optical sensor capable of generating a video signal output. The video output signal corresponds to the change in intensity of light reflected off the data array and is therefore representative of the position and orientation of the scanned symbols. The video output of such systems, after it is digitized, has a particular bit pattern which may be matched to a predetermined bit pattern. A common bit pattern of this type is a simple harmonic as in the system taught by Chandler.

It is well known to detect the presence of harmonics such as those produced by these systems in both the digital and the analog domains. However, in high speed optical systems for acquiring digital data the recognition of the target must take place in much less time than is available to recognize, for example, the touch tone of a telephone. Thus, a system for detecting any of these codes must reliably identify the harmonics caused by an optical scan of a common optical acquisition target from a signal which lasts only as long is the acquisition target is actually scanned.

As previously described, Chandler discloses a circular data array having a centrally located acquisition target comprising a series of concentric rings which produces a harmonic scan output signal. The acquisition target of Chandler provides a means of acquiring the circular label by the optical sensor and determining its geometric center and thereby the geometric center of the surrounding data array. This is done through logic circuitry which operates to recognize the pulse pattern representative of the concentric ring configuration of the acquisition target.

This recognition method relies upon a one dimensional scan of the concentric ring pattern. When the concentric ring acquisition target is advanced by a conveyor belt to the scan line of the optical scanning equipment, the scan line eventually passes through the center of the concentric rings. At that point, the harmonic scan output signal is provided at the output of the optical scanning device. This harmonic scan signal is then detected by a correlation filter. Alternately it may be detected by any other type of harmonic detection device. However, this system is subject to some false detects since other objects scanned by the optical scanning device may also provide an harmonic signal at substantially the same frequency as the concentric ring acquisition target. Another system teaching concentric ring detector of this nature is taught by Shaw in U.S. patent application Ser. No. 07/728,219, filed Jul. 11, 1991.

The system set forth in Chandler solves many of the problems of the prior art systems by providing very high data density as well as a reliable system for target acquisition. However, in addition to the problem of false detects due to the one-dimensional scan, a relatively high resolution scanning of this label is required in order to acquire the target as well as to decode the high density data. An optical scanning system capable of scanning the higher density data of the codes which solve the density problems of bar codes may therefore be more complex and costly than a system which is adapted to merely acquire a low resolution target.

Thus it is often necessary for optical scanning systems to acquire a target under very difficult circumstances. The target acquired may appear at different locations within the scanning field and may be moving rapidly. In addition to these problems the acquisition target may be disposed at varying distances from the optical scanning device. For example, labels on moving objects may be scanned at varying distances from the scanning device because of varying package sizes. This introduces magnification into the sampled sequence acquisition target. The closer the acquisition target is to the scanning device, the larger it appears and the lower the frequency of the sampled sequence. Larger scanning distances produce higher frequencies. Detection of the varying frequencies caused by varying amounts of magnification can be difficult since digital filters with adjustable poles and zeros may be expensive and complicated. Additionally the varying distance introduces the need for focussing in order to accurately scan the acquisition target.

There are two common solutions to these problems known in the prior art. One common solution to the focusing problem known in the prior art is using a depth of focus sufficient to permit detection of acquisition targets at varying distances from the optical scanning device. Another common solution to the magnification problem is fixing the distance between the optical scanning device and the acquisition target in order to prevent magnification.

Prior art references teaching the use of a large depth of focus in order to avoid focusing problems include: U.S. Pat. No. 4,544,064, entitled "Distribution Installation for Moving Piece Goods" issued to Felder; U.S. Pat. No. 3,801,775, entitled "Method and Apparatus for Identifying Objects", issued to Acker; U.S. Pat. No. 3,550,770, entitled "Method for Automatic Sorting or Recording of Objects and Apparatus for Carrying Out the Method" issued to Lund, and U.S. Pat. No 4,454,610, entitled "Methods and Apparatus for the Automatic Classification of Patterns," issued to Sziklai.

One example of a reference teaching a fixed distance between the acquisition target and the optical scanning device include: U.S. Pat. No. 3,971,917, entitled "Labels and Label Readers" issued to Maddox et al Another reference teaching this is U.S. Pat. No. 3,757,090, entitled "Mechanical Reading and Recognition of Information Displayed on Information Carriers" issued to Haefeli, et al.

A solution to both the focusing problem and the magnification problem is adjusting the distance between the acquisition target and the optical scanning device. U.S. Pat. No. 4,776,464, issued to Miller, teaches this type of adjustment. However, this method is mechanically difficult for a large number of quickly moving and closely spaced moving objects of widely varying heights. Additionally, the system taught by Shaw taught in U.S. patent application Ser. No. 07/728,219 teaches a similar solution to this problem.

SUMMARY OF THE INVENTION

The multiple code camera system of the present invention may simultaneously search for a number of different optical codes. Upon detecting an optical code it decodes according to the appropriate decoding algorithm. These codes may include information-encoded polygons, differing bar codes, and optical character recognition codes. The multiple code camera system is provided with a parallel decoding architecture which allows it to search for several codes simultaneously. The system is interconnected with two different data buses which facilitate the parallel operation. These two buses are: (1) a system bus linking the components of the multiple code camera system, and (2) a pixel bus connecting an analog-to-digital convertor from the optical scanning device to a number of different code detection boards.

Some of the different code detection boards which have already been installed in the system include: An interface board, coupled to the pixel bus, which contains logic for bar code predetection. A concentric ring detector, also coupled to the pixel bus, which performs an algorithm for detecting concentric ring targets. And for example, if optical character recognition is to be performed, an optical character recognition device can also be coupled to the pixel bus. Further code detectors can also be inserted into this architecture in order to simultaneously monitor the pixel bus and detect additional types of code. All of the processing of the simultaneous code detectors is performed in parallel with the system functions do to the parallel architecture of the multiple code camera system of the present invention. For example height sensing is performed by the system processor in parallel with the various code detection algorithms.

Within the concentric ring acquisition target detector the data from the optical scanning device is arranged to form two-dimensional arrays representative of two-dimensional scanned regions through which the acquisition target passes. The resulting two-dimensional arrays of scanned data are correlated with selected correlation templates, wherein each correlation template represents an image of the concentric ring acquisition target at a predetermined height above the belt. This method may be applied to images undergoing any type of transform in addition to magnification provided that the transformed images may be represented as template images for correlation and identification. For example, an image may be identified if it is transformed by warping, by rotating or by positioning at varying angles or rotations with respect to the scanning device.

The optical scanning device is clocked at a rate representative of the speed of the target to provide a constant number of scans per target regardless of the distance of the target from the optical scanning device. Thus the correlation templates are elliptical rather than round when they represent magnified images because magnification occurs only along the axis perpendicular to the direction of travel. The correct correlation templates are determined according to amount of magnification or warping, or the angle. The determined template is then placed into the two-dimensional correlators.

Within the ring detector differing stages are clocked at differing rates. However, it is necessary to provide constant throughput through the detector. This is achieved by interleaving the data and simultaneously performing independent processing on a current frame and a previous frame at stages of the detector.

The camera system does not require optical calibration adjustments. This is achieved by using extremely close tolerances in machining the housing for all holes used for mounting mirrors and other optical elements. Thus these elements can be secured at exactly the correct location when the camera system is assembled. Additionally, extremely close tolerance ribbing is provided so that when the reflector of the camera system is resiliently secured against the ribbing it maintains its correct elliptical shape. The illumination source of the multiple code camera system and the conveyor belt are disposed upon respective loci of an ellipse wherein the resiliently secured reflector above the illumination source is adapted to follow the shape of the ellipse.

In the camera system of the present invention the scanning rate of the optical scanning device is controlled by the belt speed. The belt speed is applied to scanning device via the encoder output. Because the scan rate is controlled according to the belt speed, at lower belt speeds the amount of integration time per scan increases. Thus the illumination requirements of the optical scanning device decreases at lower belt speeds and increases at higher belt speeds. Compensation for the amount of illumination provided by the illumination source as well as compensation for the integration time is performed by adjusting the amplitude of the entire video signal based on the amplitude of a white reference.

Two methods for performing the white reference correction are provided. One method for performing the white reference correction is by applying the encoder output to a frequency-to-voltage convertor and controlling the amplitude of the video signal from the optical scanning device according to the DC level output of this convertor.

Another method for performing the white reference integration uses light transmitted by way of fiber optic cables. In this method the fiber optic cables are arranged from each of the bulbs of the illumination source to selected pixels of the optical scanning device. These selected pixels are dedicated to the white reference integration and therefore are not available to represent information encoded upon an optical target.

Preferably separate optical fibers are run from each bulb of the illumination source to prevent bulbs from dominating each other due to their relative proximity to the sensor. The output signal of the scanning device corresponding to these dedicated pixels is then used to control the white reference integration. The encoder may also used to control the illumination level of the illumination source. Thus the illumination source may be dimmed when the belt is travelling more slowly.

The dark reference is based upon the output of a blind cell within the optical scanning device which is sampled during each scan cycle. The problem solved by the dark reference integration is that in the output of the optical scanning device a small information value may ride upon a large DC offset. This offset can vary depending upon temperature and aging of the camera system. In the present invention an iterative integration is performed for each scan of the optical scanning device based upon the output of the dark cell to correct for the offset. The camera system of the present invention thus performs continuously repeated integrations to maintain an offset correction on a scan-by-scan basis.

The multiple code camera system of the present invention is provided with a real time focusing system. In the real time focusing system an object height sensor constantly determines the distance from the camera to a surface below it. The camera optics of the multiple code camera are constantly focused according to this measured distance. In this real time focusing system, or continuous focus system, a delay between the measurement of a distance and the control of the camera optics according to the measured distance is adjusted according to the speed of the conveyor belt as determined from an encoder output.

The multiple code camera system of the present invention is provided with a forced air convection cooling circuit for cooling, for example, the electronics of the system. In this cooling circuit air is forced over the electronic circuits of the camera system, through a bleed channel, over the system power supply, through a heat exchange compartment, and back to the electronic circuits. In the heat exchange compartment, thermal exchange with the exterior of the camera system is permitted through the skin of the compartment. Additionally, the bleed-through channel between the electronics and the system power supply is adapted to permit dissipation of some of the system heat from the air circulating from the electronic circuits to the power system supply.

The camera of the multiple code camera system, the electronic circuits, and the system power supply are disposed in separately sealed compartments. The sealed electronic circuit compartment and the sealed system power supply compartment are in fluid communication with each other by way of the bleed-through channel. The overall air circuit is also sealed. Because the overall circuit is sealed, the circulated air is substantially dust free.

There are advantages to disposing a camera system such as the multiple code camera system of the present invention horizontally rather than vertically. One important advantage is the ability to stack conveyor belts above each other more closely when the camera systems are disposed horizontally. Additionally, horizontally disposed systems are less subject to vibration. In the past these systems were always vertical and natural convection currents could be relied upon for cooling them. Thus it is because of the forced convection that the present system may be disposed horizontally.

DETAILED DESCRIPTION OF THE INVENTION

Figure 1:
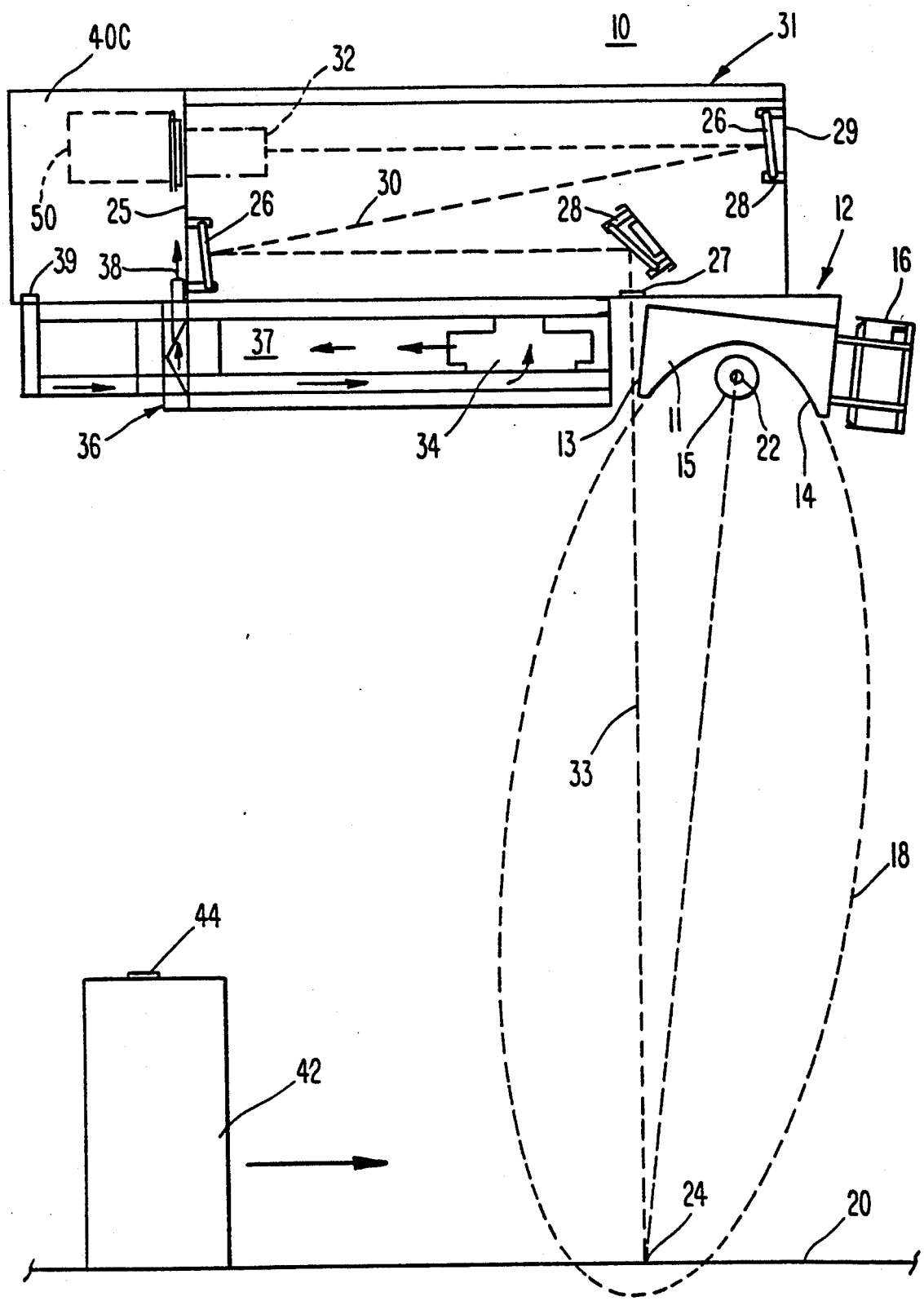
FIG. 1 shows a side view of the multiple code camera system of the present invention.

Referring now to FIG. 1, there is shown a side view of horizontally disposed multiple code camera system 10 of the present invention. Within multiple code camera system 10 optically readable information-encoded label 44 is disposed upon moving package 42 which is transported by conveyor belt 20. As information-encoded label 44 is thus transported past camera axis 33, it is scanned by camera 50 of multiple code camera system 10 to provide electrical signals representative of light reflected off label 44. It will be understood that the light reflected off optically readable label 44 represents the information which is encoded in label 44.

Illumination of optically readable information-encoded label 44 within multiple code camera system 10 is provided by adjustable illumination system 12. Adjustable illumination system 12 includes a plurality of illumination sources 15 or bulbs 15 each disposed within reflector box 13 and controlled by an individual power supply 16. Each individual power supply 16 may be separately controlled in a conventional manner in order to control the light energy provided by its corresponding illumination source 15.

Adjustable illumination system 12 of camera system 10 is also provided with elliptical reflector 14 within reflector box 13. Elliptical reflector 14 is conformed to the shape of a portion of illumination ellipse 18 by ribs 11 and thereby defines illumination ellipse 18. Elliptical reflector 14 is adapted to reflect light energy emitted from illumination sources 15 onto optically readable label 44 disposed above conveyor belt 20. Illumination sources 15 and conveyor belt 20 are disposed upon focuses 22, 24 of illumination ellipse 18, respectively.

Light emitted by illumination sources 15 and reflected from moving package 42, information-encoded label 44, and conveyor belt 20 is received by mirror box 31 by way of optical aperture 27. Light received by way of optical aperture 27 is folded by three mirrors 26 to provide folded optical path 30 within mirror box 31. The position of brackets 28, for example on mirror box walls 25, 29, are determined to very close tolerances. Thus the positions of mirrors 26 may be precisely determined thereby eliminating the need for calibration by the fixed optics of camera system 10. The increased total optical path length provided by folded optical path 30 makes multiple code camera system 10 less sensitive to the height of moving packages 42 above conveyor belt 20 as is well understood by those skilled in the art.

Horizontally disposed multiple code camera system 10 is provided with sealed forced air convection cooling system 37 for cooling the electronics (not shown) and the system power supply (not shown) of camera system 10. Sealed forced air convection cooling system 37 includes impeller 34 for drawing hot air into heat exchange compartment 36 by way of heat exchange inlet 39 and forcing cooled air from heat exchanger compartment 36 by way of heat exchange outlet 38. Air is cooled within heat exchange compartment 36 by thermal exchange with the environment external to heat exchange compartment 36 through the skin of compartment 36. The cooled air expelled from compartment 36 by way of heat exchange outlet 38 is used within multiple code camera system 10 to cool both the system electronics and the system power supply.

Figure 2:
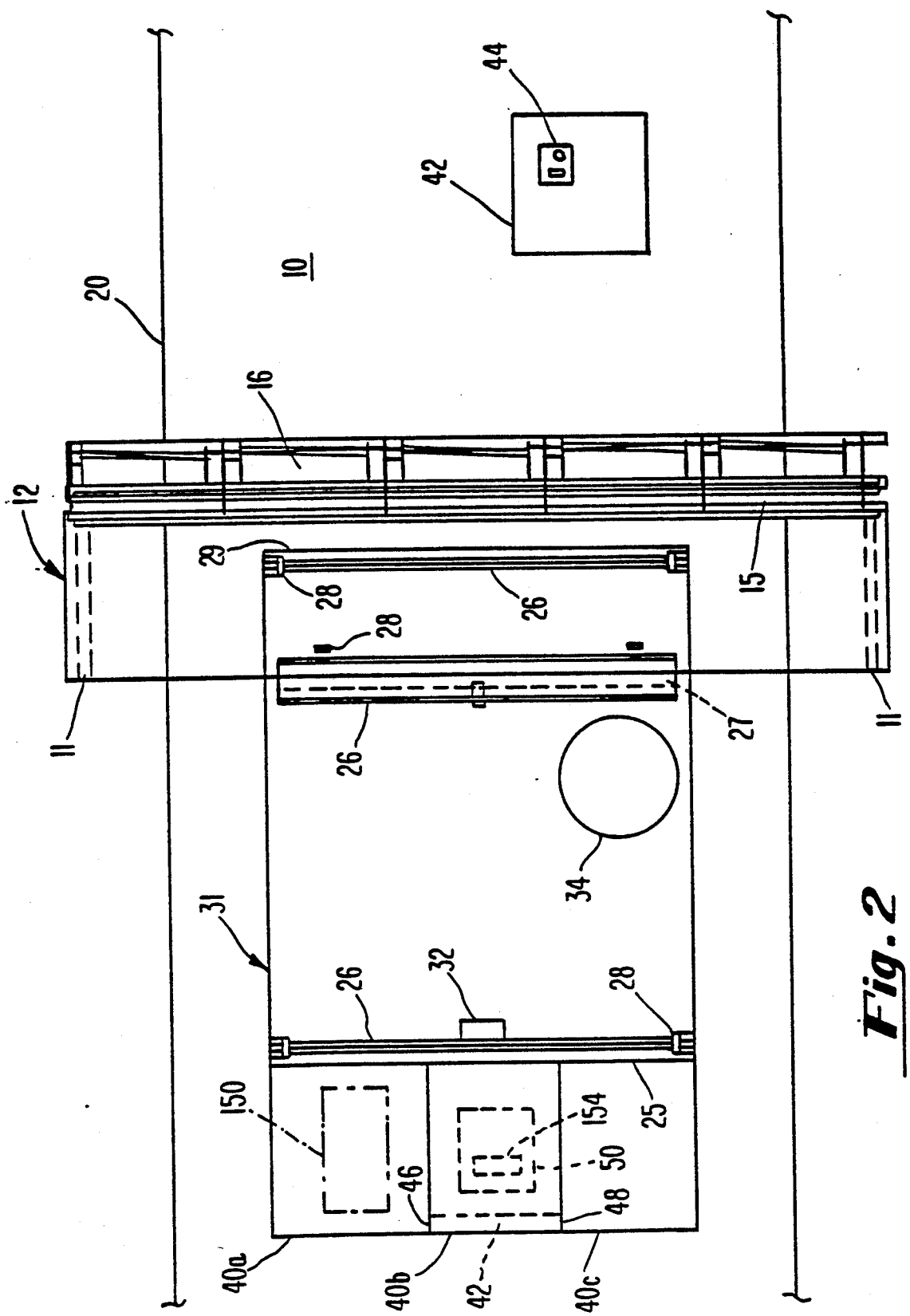
FIG. 2 shows a plan view of the multiple code camera system of FIG. 1.

Referring now to FIG. 2, there is shown a plan view of multiple code camera system 10 of the present invention. Multiple code camera system 10 is provided with three separately sealed compartments 40a,b,c. Separately sealed compartment 40a houses the system electronics of camera system 10 and separately sealed compartment 40c houses the system power supply of camera system 10. Thus, the components within sealed compartments 40a,c are the components which must be cooled by forced air convection cooling system 37. Separately sealed compartment 40b houses camera 50, which does not require cooling within multiple code camera system 10. The positioning of the system electronics of compartment 40a and camera 50 of compartment 40b substantially close to each other within the same housing of camera system 10 permits very short cables between camera 50 and the electronics of compartment 40a. This results in better noise immunity within camera system 10.

In forced air convection cooling system 37 cooled air expelled from heat exchange outlet 38 is directed to separately sealed compartment 40a by way of an opening through the floor of compartment 40a. Cooled air from outlet 38 is then forced across the circuit boards (not shown) within separately sealed compartment 40a in order to cool the electronic circuitry of camera system 10. After passing over the circuit boards of sealed compartment 40a air exits sealed compartment 40a by way of inlet 46 of bleed-through channel 42. Bleed through channel 42 extends from electronics compartment 40a to system power supply compartment 40c and serves as a conduit therebetween.

Bleed-through channel 42 of convection cooling system 37 is adapted to partially cool air which has been warmed by contact with the electronics of separately sealed compartment 40a as the air is conducted to compartment 40c. This partial cooling is achieved by permitting dissipation of thermal energy through the skin of bleed-through channel 42 to the environment external to multiple code camera system 10.

Partially cooled air from bleed-through channel 42 is then applied by way of channel outlet 48 to separately sealed compartment 40c which contains the system power supply (not shown) of multiple code camera system 10. This partially cooled air is effective to cool the power supply as it flows over the power supply toward heat exchange inlet 36. The warmed air from separately sealed compartment 40c is then cooled within heat exchange compartment 36 of convection cooling system 37. This forced convection circuit is then repeated when the cooled air is directed back to sealed compartment 40a by impeller 34.

As previously described, illumination sources 15 and conveyor belt 20 are disposed upon focuses 22, 24 of illumination ellipse 18, respectively. Light emitted from illumination sources 15 in an upward direction reflects off elliptical reflector 14 and is directed by elliptical reflector 14 in a substantially downward direction. It will be understood by those skilled in the art that light reflected in this manner by elliptical reflector 14 is focused substantially in the direction of focus 24. It will also be understood by those skilled in the art that light emitted from focus 22 at any angle would be reflected to focus 24 if elliptical reflector 14 is extended over the entire circumference of illumination ellipse 18. Thus, the shape of elliptical reflector 14 optimizes the amount of light energy emitted from illumination sources 15 which arrives at focus 24.

In order to define illumination ellipse 18 reflector 14 is resiliently disposed against ribs 11 within reflector box 13. It will be understood that if ribs 11 are produced with very close tolerances to define ellipse 18 that calibration of reflector 14 is not needed. Reflector 14 is merely bent, inserted against ribs 11, and caused to resiliently conform to the shape of ribs 11 when released.

Figure 3:
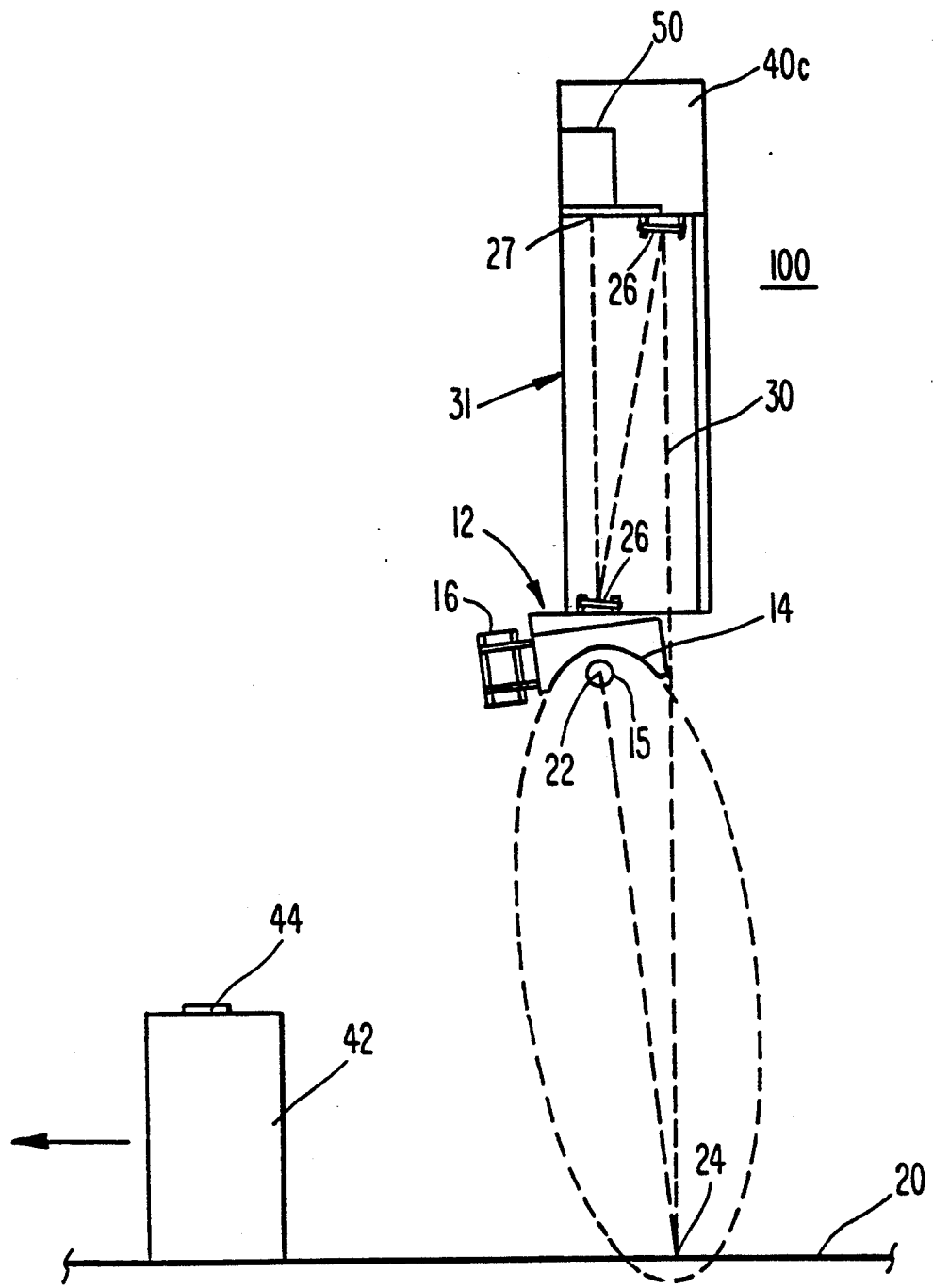
FIG. 3 shows a side view of an alternate embodiment of the multiple code camera system of FIG. 1 wherein the alternate embodiment is disposed vertically and cooled by natural convection currents.

Referring now to FIG. 3, there is shown vertically disposed multiple code camera system 100. Vertically disposed multiple code camera system 100 is an alternate embodiment of horizontally disposed multiple code camera system 10. Alternate embodiment camera system 100 is adapted to be disposed in a vertical position rather than in a horizontal position while scanning conveyor belt 20 for information-encoded label 44 disposed upon moving package 42. Vertically disposed camera system 100 is cooled by natural convection currents rather than the forced convection currents provided by forced air cooling system 37 for cooling the components of horizontally disposed camera system 10. Cooling system 37 of camera system 10 is effective to permit camera system 10 to function properly when disposed horizontally because it moves the air within camera system 10 to provide the cooling which is provided within vertically disposed multiple code camera system 100 by natural convection currents.

Thus, it will be understood by those skilled in the art that it is the forced air of convection cooling system 37 which permits multiple code camera system 10 to be disposed horizontally. Horizontally disposed camera system 10 is therefore adapted to be used more advantageously in applications where conveyor belts 20 are stacked above each other and camera system 10 must be positioned between conveyor belts 20. Additionally, in applications in which other items are disposed proximately above or below conveyor belt 20 preventing enough vertical space for vertically disposed camera system 100 it is advantageous to use horizontal camera system 10.

Furthermore horizontal positioning of multiple code camera system 10 permits camera system 10 to be used in environments which are subject to more vibration because vertically disposed systems such as camera system 100 are more sensitive to the vibration. However, it will be understood that when conditions requiring horizontal placement of a camera system are not present, the natural convection cooling of horizontally disposed camera system 100 is sufficient to dissipate the thermal energy of camera system 100 thereby eliminating the need for forced air convection cooling system 37.

Figure 4:
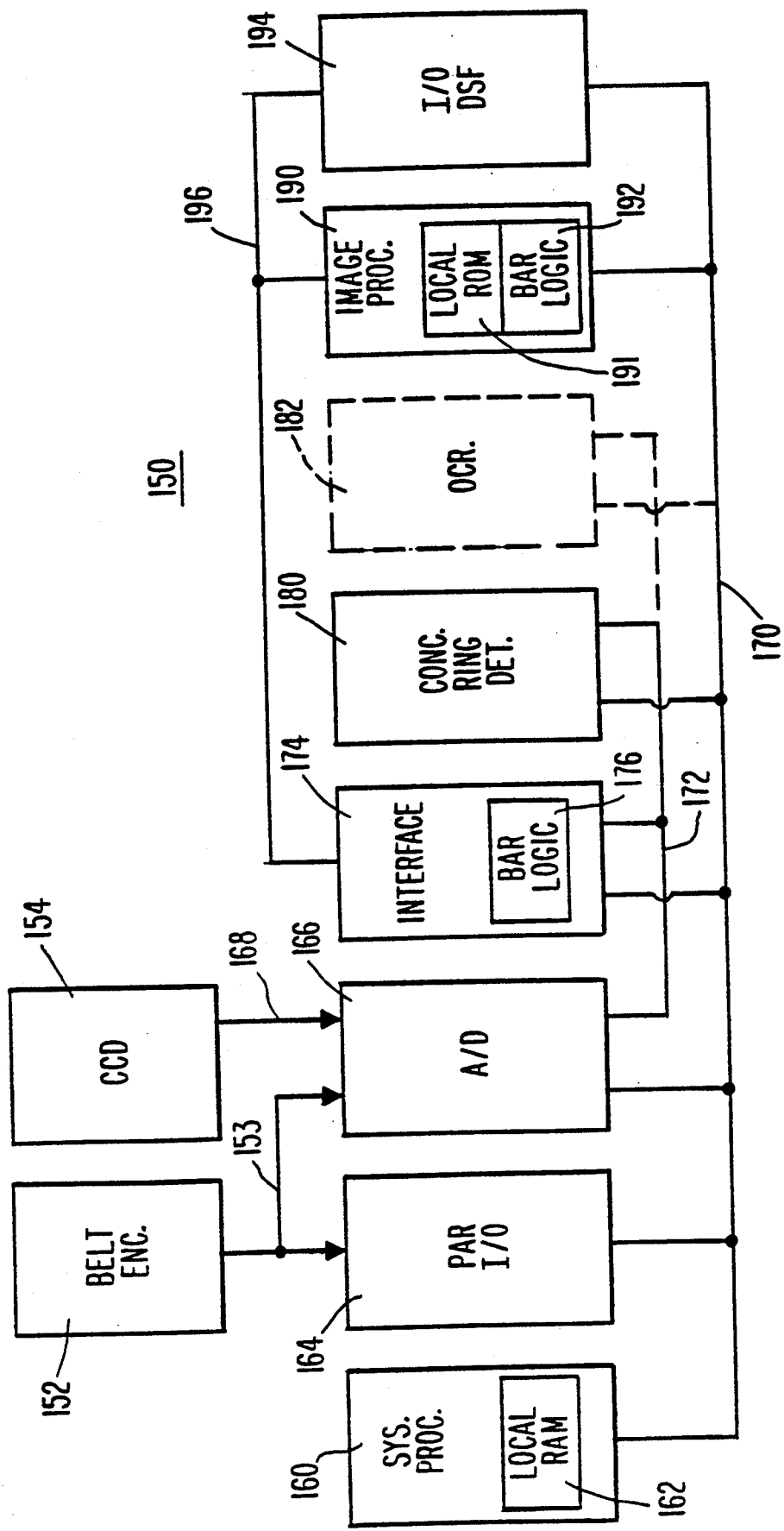
FIG. 4 shows a block diagram representation of the data processing architecture of the multiple code camera system of FIG. 1 for scanning moving targets simultaneously for a plurality of differing acquisition targets and a plurality of differing codes and acquiring and decoding the targets.

Referring now to FIG. 4, there is shown parallel video processor architecture 150 of multiple code camera systems 100. Parallel video processor architecture 150 includes system processor 160, bar code interface processor 174, concentric ring detector processor 180, image processor 190, and digital signal processor 194, all coupled to the same processor system bus 170. It will be understood by those skilled in the art that coupling this plurality of processors 160, 174, 180, 190 and 194 processor to system bus 170 permits simultaneous processing of the system functions of camera systems 10, 100 as well as the video processing and target detection functions within parallel architecture 150. The system functions of multiple code camera systems 10, 100 include such functions as the processing of the height information of moving packages 42 upon conveyor belt 20.

Additionally, parallel video processor architecture 150 of camera systems 10, 100 is provided with pixel bus 172 which transmits image data. Pixel bus 172 applies the output data of optical scanning device 154, received by way of analog-to-digital convertor 166, to both bar code interface 174 and concentric ring detector 180. Because of the use of bus 172, both bar code interface 174 and concentric ring detector 180 may simultaneously operate upon the pixel data provided by optical scanning device 54 as optical scanning device 154 scans moving packages 42. Thus targets with both rectangular configurations and circular configurations may be searched for simultaneously.

The use of bar code interface 174 and concentric ring detector 180, coupled in this manner to pixel data bus 172, permits parallel architecture 150 of multiple code camera systems 10, 100 to simultaneously search for both bar codes and concentric rings. Additionally, optical character recognition system 182, or any further conventional code or target detection system, may be simultaneously coupled to pixel data bus 172 to permit simultaneous searching for additional types of information-encoded symbols or target configurations. It will be understood that if optical character recognition system 182 is applied to parallel architecture 150, system 182 may operate independently of image processor 190 and digital signal processor 194.

When bar code interface 174 or concentric ring target detector 180 detects, respectively, a bar code or concentric rings as a result of the simultaneous searching of the pixel data within parallel architecture 150, it provides a respective detect signal. It will be understood that a detect signal provided by bar code interface 174 indicates a pre-recognition of a bar code disposed upon information-encoded label 44. It will also he understood that a detect provided by concentric ring detector 180 indicates the preliminary detection of concentric rings disposed on information-encoded label 44.

In response to a detect signal from either interface 174 or detector 180, video image processor 190 and input/output digital signal processor 194 proceed with further processing of the detected symbol. This further processing occurs simultaneously with the processing of normal system functions by system processor 160. Thus it will be understood that digital signal processor 194 is not adapted to function as a co-processor for system processor 160.

In a similar manner, optical character recognition system 182 may monitor the pixel data of pixel data bus 172 simultaneously with the processing of bar code interface 174 and concentric ring detector 180. Thus optical character recognition system 182 may search for optical characters in parallel with the search for bar codes and concentric ring acquisition targets which may be disposed upon information-encoded labels 44. A separate detect signal may be provided by system 182 when an optical character is scanned by optical scanning device 154.

With respect to the system functions of parallel video processor architecture 150 it will be understood by those skilled in the art that system processor 160 is effective to coordinate and control all processing activities within parallel architecture 150. System processor 160 is also effective to control the interfacing with other peripherals (not shown) which may be coupled to camera systems 10, 100. The system functions performed by system processor 160 may include, but are not limited to, coordination of the focusing of camera 50, belt encoder 152, the height sensing operations associated with packages 42, as well as the coordination of analog-to-digital convertor 166, concentric ring detector 180, input/output digital signal processor 194 and image processor 190.

It will be understood that system processor 160 of parallel architecture 150 is also responsible for the data processing associated with the movement of packages 42. This package data processing by system processor 160 includes coordinating the leading and trailing edges of moving packages 42 with detected labels 44. It also includes controlling the movement of diverters (not shown) of a conveyor system wherein multiple code camera system 10 is applied. Additionally, system processor 160 may track system performance, log data and provide site configuration of the reader front end electronics. For example, heights of moving packages 42 may be recorded within the system functions performed by system processor 160 for the purpose of assigning labels 44 to moving objects 42 and determining points for diverter operation.

When signal processor 160 identifies moving packages 42 or other objects 42 on conveyor belt 20 using, for example, height sensing data, the objects 42 are recorded in an object cue within local memory 162 of system processor 160. Simultaneously, images of information-encoded labels 44 disposed upon packages 42 are stored in a label cue in local memory 191 of image processor 190. Digital signal processor 194 then provides an interrupt signal corresponding to each new optically readable label 44 scanned by optical scanning device 154 and its position on conveyor belt 20. When this interrupt is received by system processor 160 of parallel architecture 150, system processor 160 relates each label 44 to its package 42 based upon its position on conveyor belt 20. When image processor 190 completes processing and system processor 160 does final error correction, the decoding of the resulting label message is entered in the package cue.

Simultaneous with the performance of these system functions by system processor 160 images processor 190 performs the functions required for processing the images scanned by optical scanning device 154. Image processor 190 may perform such functions as fast Fourier transforms and inverse fast Fourier transforms for the detection of concentric ring acquisition targets. Image processor 190 may also serve as a processor for converting a label image into a stream of symbol element color states. Other functions of image processor 190 include edge enhancement, removal of concentric rings from label images and the determination of the orientation of labels 44. The control of data to and from image processor 190 is performed by system processor 160 as previously described.

Concentric ring detector 180 of parallel video processor architecture 50 converts and buffers the video data of pixel data bus 172 and the concentric ring detect signals. These signals are transmitted to interface 174 via bus 172. The interface 174 computes the coordinates of concentric rings and transmits to I/O digital signal processor 194 via bus 196. Digital signal processor 194 then locates images of actual information-encoded labels 44 amidst the video scan data at possible concentric ring locations after pro-recognition of the rings.

Parallel input/output block 164 of parallel video processor architecture 150 includes a large number of parallel input/output bits (not shown) and programmable timers (not shown). Belt encoder 152 applies a signal representing the speed of conveyor belt 20 to block 164 by way of line 153 and clocks two timers within parallel input/output block 164. One of these two timers is used to track the absolute position of conveyor belt 20. The other timer of block 164 clocked by belt speed encoder 152 is used to generate an interrupt when a predetermined length of conveyor belt 20 has passed. The ability of parallel input/output block 164 to provide interrupts in accordance with the output of belt speed encoder 152 permits parallel architecture 150 to compensate for the speed of conveyor belt 20.

When the presence of a concentric ring acquisition target within the region scanned by camera systems 10, 100 is indicated an interrupt is provided. This interrupt causes a block copy of the corresponding image of information-encoded label 44 to image processor 190. The image is then converted within image processor 190 into simple element color states and the results are transmitted to system processor 160 by way of system bus 170. The label data received by system processor 160 is matched to a particular package 42 disposed upon conveyor belt 20 and the symbol elements representative of label 44 upon package 42 are converted into label information. For example, this label information may be an address or a zip code for packages 42.

When the interrupt signals occur, scaled images of information-encoded labels 44 are copied within parallel video processor architecture 150 from digital signal processor 194 to image processor 190. Processing of images within image processor 190 begins when one full unprocessed label image is formed within image processor 190. When the image processing is complete, image processor 190 writes the results to a temporary storage cue and informs system processor 160 by means of an interrupt.

Processing by image processor 190 results in a map of label symbol elements wherein each element is assigned a bit value. Additionally, a pixel map of the image originally presented to image processor 190 may be provided. Image processor 190 may also provide, for example, windowed images, enhanced images, frequency domain images, bright point coordinates, selected orientation, clock image and representations of the coordinates of each symbol element center.

Image processor 190 and input/output digital signal processor 194 are coupled to each other, and to interface 174, by way of image bus 196. Image bus 196 is a high speed data path of the kind known to those skilled in the art of circuitry for the processing of video images, such as image processor 190. It is by way of image bus 196 that interface board 174 applies a black and white version, or raw image, to image processor 190 in a compressed format.

Additionally, low pass filtering is performed on interface board 174 for clumping white points together with each other and clumping black points together with each other. The clumped points are applied to image processor 190 for bar code detection by way of image bus 196. It will be understood that a detect of concentric rings by interface board 174 just provide a flag and does not produce the exact coordinates of the center of the concentric rings. Finding the exact coordinates of the center is performed by image processor 190 after the data is applied by interface 174 to image processor 190 by way of image bus 194.

Figure 5:
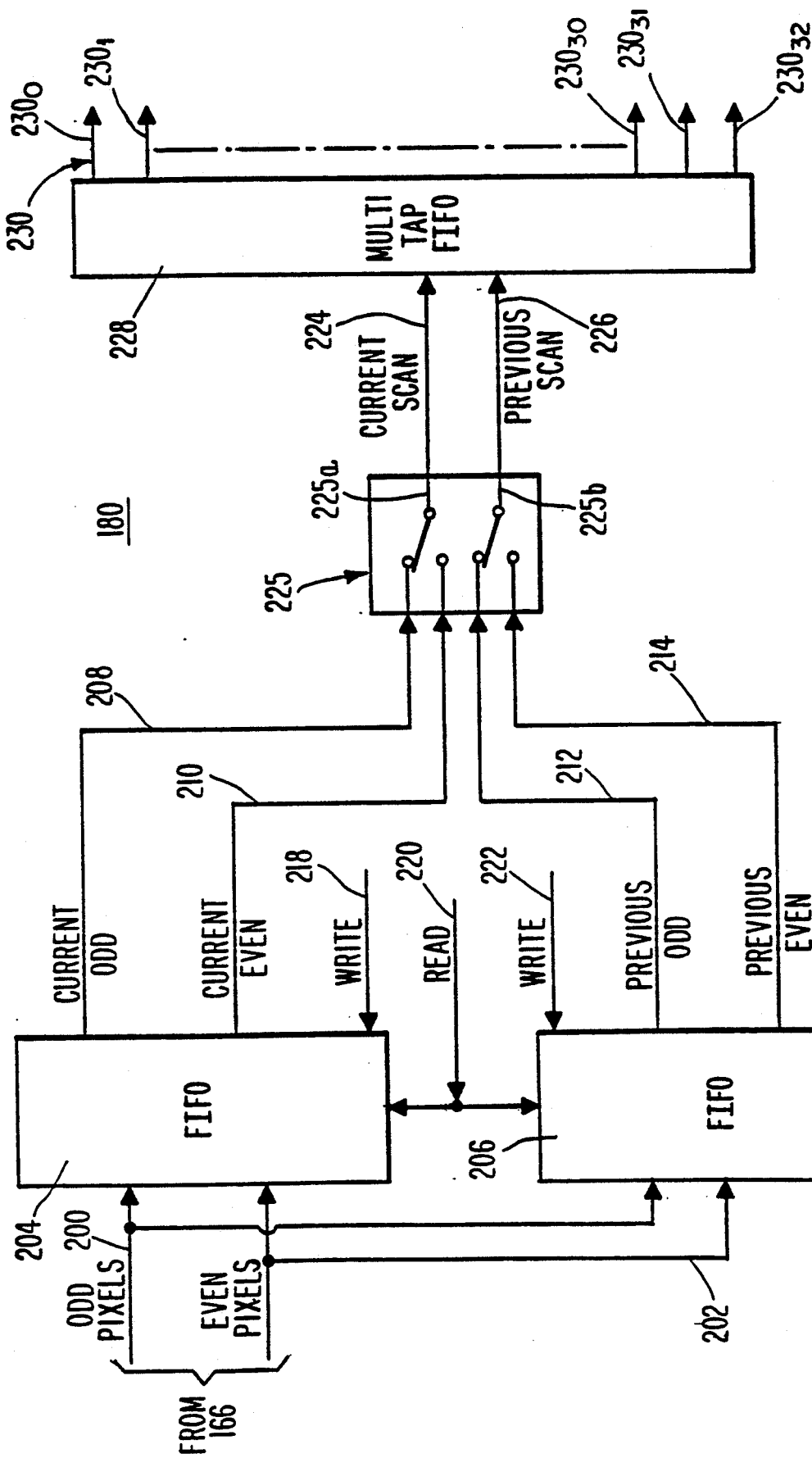
FIG. 5 shows a more detailed block diagram representation of a portion of the concentric ring acquisition target detector of the parallel architecture of FIG. 4.
Figure 6:
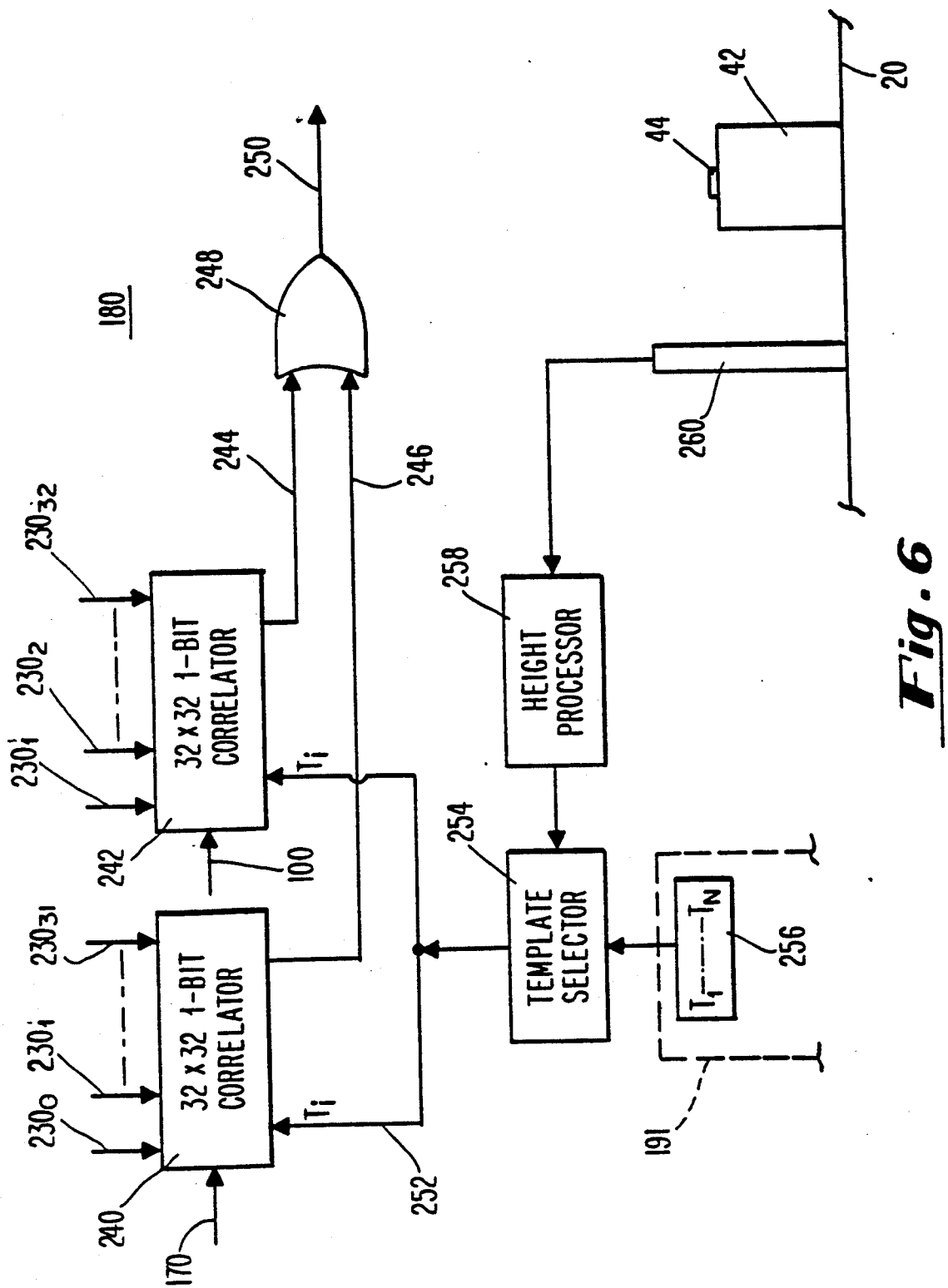
FIG. 6 shows a more detailed block diagram representation of a portion of the concentric ring acquisition target detector of the parallel architecture of FIG. 4

Referring now to FIGS. 5, 6, there is shown a more detailed representation of concentric ring target detector 180 of parallel video processor architecture 150 within multiple code camera systems 10, 100. Concentric ring target detector 180 receives input pixel data from optical scanning device 154 on input lines 200, 202 by way of analog-to-digital convertor 166 and pixel data bus 172. The pixel data received from scanning device 154 by way of convertor 166 and bus 172 are representative of images of conveyor belt 20 and moving objects 42 bearing information-encoded labels 44 which are advanced by conveyor belt 20.

The input pixel data is applied, alternately, to first-in first-out block 204 and first-in first-out block 206 by way of both odd pixel input line 200 and even pixel input line 202. This alternate writing of pixels into first-in first-out blocks 202, 204 is performed under the control of write control line 218 of first-in first-out block 204 and write control line 222 of first-in first-out block 206. Write control lines 218, 222 are alternately active one-half of the time during operation of concentric ring detector 180.

Thus, both odd and even pixels are simultaneously applied to first-in first-out block 204 during one half of the time that detector 180 is in operation by way of detector input lines 200, 202. During the other half of the operation, both odd pixels and even pixels are simultaneously applied to first-in first-out block 206 by detector input lines 200, 202.

It will therefore be understood that during the write operations of concentric ring detector 180, the pixels received by each first-in first-out block 204, 206 include both odd pixels, by way of input line 200, and even pixels, by way of input line 202. In this manner detector input lines 200, 202 both constantly supply pixel data to one or the other of the two blocks 204, 206 within concentric ring detector 180. Input lines 200, 202 both apply pixels to block 204 when write control line 218 is active (during odd scan lines) and input lines 200, 202 both apply pixels to block 206 when write control line 222 is active (during even scan lines).

Thus block 204 contains both the odd pixels and the even pixels of a current scan line N and block 206 contains both the odd pixels and the even pixels of a previous scan line N−1. The pixels thus received by first-in first-out blocks 204, 206 are then applied to multi-tap first-in first-out block 228 by way of pixel switching system 225. Therefore, first-in first-out blocks 204, 206 may each receive one-half of the pixels from digital-to-analog board 166 and apply pixels their respective pixels to pixel switching system 225 at one-half the rate at which they were received by way of detector input lines 200, 202.

As described the rate at which first-in first-out block 204 applies data by way of current scan lines 208, 210 to pixel switching system 225 is one-half of the rate at which data is applied to first-in first-out block 204 by way of detector input lines 200, 202. Similarly, the rate at which first-in first-out block 206 applies data to pixel switching system 225 by way of previous scan lines 212, 214 is one half of the rate at which data is applied to first-in first-out block 206 by way of detector input lines 200, 202.

The transmission of data through each first-in first-out block 204,206 may thus be understood by means of an analogy to filling a fluid container while the fluid container is simultaneously draining at one-half of the filling rate. If two such fluid containers are provided, and each is filled one-half of the time while both drain constantly, the total throughput may remain constant without the containers ever overflowing or emptying. The constant rate of the throughput of such a fluid system is twice the draining rate of a single one of the containers.

Both first-in first-out blocks 204, 206 apply data to pixel switching system 225 the entire time that concentric ring detector 180 is operating. This constant flow of data from blocks 204, 206 occurs under the control of read control line 220. It will be understood that, unlike separate write control lines 218, 222, single read control line 220 is applied to both blocks 204, 206 simultaneously. This is done in order to permit both blocks 204, 206 to constantly and simultaneously apply their data to pixel switching system 225 even though only one of them is receiving data at a time. It will also be understood that all four block output lines 208, 210, 212, 214 are constantly active when data is applied to ring detector system 180.

Because of the conventional design of optical scanning device 154, wherein odd pixels and even pixels are provided separately, first-in first-out block 204 is adapted to receive odd pixels and even pixels separately by way of detector input lines 200, 202. First-in first-out block 204 then outputs the received pixels separately as odd pixels and even pixels on lines 208, 210 respectively. Thus, switch 225a of pixel switching system 225 toggles and alternately receives an odd pixel from block output line 208 and an even pixel from block output line 210. In this manner, switch 225a of switching system 225 puts the pixels of lines 208, 210 back into serial order for application to multi-tap first-in first-out block 228 by way of current scan line 224.

In a similar manner, first-in first-out block 206 provides odd pixels on output line 212 and even pixels on output line 214. The odd and even pixels of lines 212, 214 are alternately received by pixel switching system 225 and put into serial order by the toggling of switch 225b of pixel switching system 225. The scan data put into serial order by switch 225 is applied to multi-tap first-in first-out block 228 by way of current scan line 224 and previous scan line 226. Pixels applied to first-in first-out block 228 by way of current scan line 224 and previous scan line 226 are then shifted through block 228. Output tap system 230 of block 228 is provided to permit a read of each pixel written to block 228 by way of scan lines 224, 226 on each cycle as the pixels are shifted through block 228.

Output taps $230_0$–$230_{31}$ of output tap system 230 are applied to template correlator 240 and output taps $230_1$–$230_{32}$ are applied to template correlator 242. Taps $230_0$–$230_{31}$ apply a current image frames of a possible concentric ring target to template correlation 240. In a similar manner taps $230_1$–$230_{32}$ of output tap system 230 contain the image frame previous to the current image frame. Thus, two different image frames are compared simultaneously, one within template correlator 240 and other within template correlator 242 of concentric ring detector 180.

As previously described, moving package 42, bearing information-encoded label 44, is transported by conveyor belt 20 within camera systems 10, 100. Any height sensing device 260 (for example a conventional light curtain) may be used to determine the height of moving package 42 and, therefore, the distance between information-encoded label 44 and optical scanning device 154. The height information from height sensing device 260 is applied to height processor 258. Height processor 258 uses this height information to select one of a predetermined number of templates $T_1 \ldots T_N$ stored in template block 256 of local memory 191 within image processor 190.

Templates $T_1 \ldots T_N$ stored within template block 256 each represent an image of a concentric ring acquisition target disposed on information-encoded label 44 at one of several predetermined heights as scanned by optical scanning device 154. For example, template $T_1$ may correspond to a scanned image of the concentric ring target at the level of conveyor belt 20 while template $T_N$ may correspond to an image of concentric rings at the maximum permitted height of moving package 42.

Thus, in accordance with the height information from height sensor 258, a selected template $T_i$ corresponding to the height of moving package 42 sensed by height sensor 260 is retrieved by template selector 254. The selected template $T_i$ is then applied to both template correlators 240, 242 by way of common template correlation line 252. In this manner, both a current scan of scanning device 154 and a previous scan are correlated with the selected template $T_i$ simultaneously within concentric ring detector 180. If either template correlator 240 or template correlator 242 achieves above a predetermined correlation threshold, a detection signal as applied to gate 248 by way of either correlator output line 244 or correlator output line 246. When a correlation signal is applied to gate 248 by way of either line 244 or line 246, detection signal line 250 goes active at a point where the coordinates of the center of the concentric rings disposed on information-enclosed label 44 can be determined.

Figure 7:
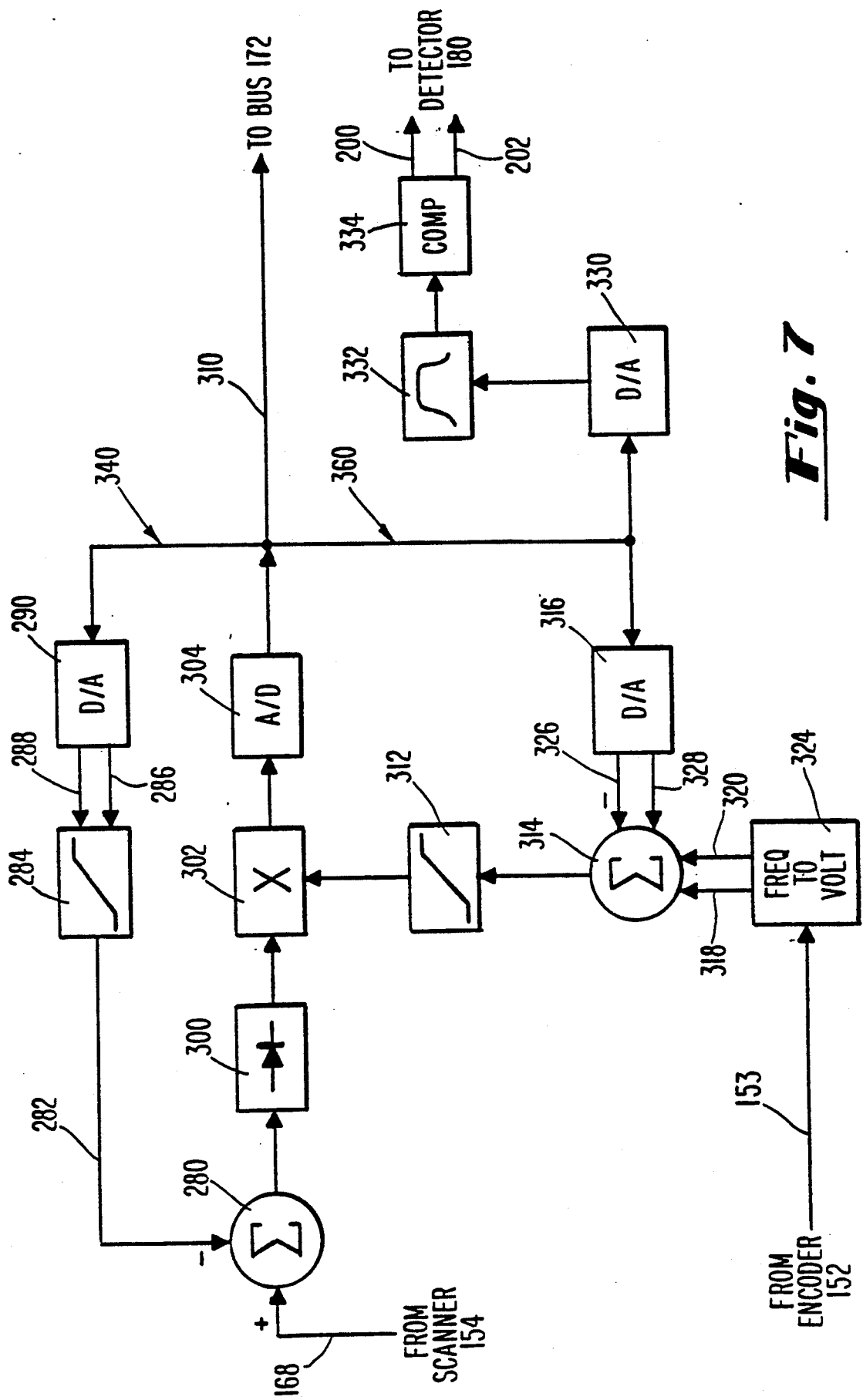
FIG. 7 shows a more detailed representation of the analog-to-digital converter of the parallel architecture of FIG. 4 for receiving and adjustably processing the output of the optical scanning device according to the speed of the conveyor belt.

Referring now to FIG. 7, there is shown a more detailed representation of analog-to-digital convertor 166 of parallel video processor architecture 150. The pixel data video signal from optical scanning device 154 is applied to analog-to-digital convertor 166 by video scanner output line 168. The video information received by analog-to-digital convertor 166 is applied to ideal diode 300 by way of summation circuit 280. The output of ideal diode 300 is applied to analog-to-digital block 304 which converts the analog signal output of ideal diode 300 to a digital signal. This digital signal output is applied to pixel decoding bus 172 by way of convertor output line 310.

In addition to the analog-to-digital conversion performed by analog-to-digital block 304 within convertor 166, a dark level or DC offset correction and a white level or gain correction are performed within convertor 166 upon the pixel data received from optical scanning device 154. These two corrections eliminate the need for several calibrations within multiple code camera systems 10, 100. The calibrations eliminated are both those associated with bringing camera systems 10, 100 on-line and those associated with wear and aging of components within camera systems 10, 100.

The dark level or DC offset correction integration within converter 166 is performed by dark reference integration loop 340. In dark reference integration loop 340 the output of analog-to-digital convertor block 304 is applied back to the input of analog-to-digital convertor block 304 by way of integrator 284 and summation node 280. The white level or gain correction within converter 166 is performed by white reference integration feedback loop 360. In light reference integration loop 360 the output of analog-to-digital convertor block 304 is applied back to the input of analog-to-digital convertor block 304 by way of summation node 314 and integrator 312.

Dark reference integration loop 340 performs correction for the DC offset of the video signal provided by optical scanning device 154 within camera 50. It will be understood by those skilled in the art that the information signals provided to analog-to-digital converter 166 for processing may be on the order of twenty millivolts, while the DC offset may be on the order of nine volts. Additionally, it will be understood that the twenty millivolts of useful information may be only a portion of the signal riding on top of the DC offset. The remaining portions riding on the offset may correspond to artifacts caused by optical scanning device =54. Furthermore, these artifacts may be an order of magnitude greater than the information signal. This information signal within the output of scanning device 154 portion must be extracted for each one of the video pixels.

The white integration is provided in analog-to-digital convertor 160 because the high speed of moving objects 44 does not permit very much time for the light from illumination system 12 of camera system 10 to accumulate charge within optical scanning device 154 of camera 50. Thus the signal output on scanner output line 168 of camera 50 has a small difference between a pixel corresponding to the brightest spot scanned by camera 50 and a pixel corresponding to the darkest spot scanned by camera 50. This small difference in amplitude requires special processing within convertor 166. Additionally, the amplitude of signals from optical scanning device 154 corresponding to a constant amount of light changes with age, component sensitivity and other factors.

In order to permit compensation for the DC offset of the output of optical scanning device 154 there is a dark reference pixel which corresponds to a dedicated sensor element within device 154. The dedicated sensor element for the dark pixel is not exposed to light within scanning device 154. This dedicated sensor element accumulates a charge based upon factors other than light exposure. For example, the charge accumulated by this sensor element depends upon thermal effects within device 154. A value corresponding to the change accumulated by this dedicated sensor element is provided at the output of optical scanning device 154.

Thus, the output of the dedicated sensor element corresponding to the dark pixel may be used to set the black level within camera systems 10, 100 by clamping the signal of video output line 168 to the output of that element. This may be used to null the DC offset. When the clamped signal is applied to ideal diode 300, ideal diode 300 eliminates much of the unwanted artifacts from the video signal. The amplitude of the remaining signal corresponds to the brightness of the pixels of scanning device 154.

When the dark pixel is applied to multiplier 302, it is known when the black pixel will appear at the output of multiplier 302. When the black pixel appears at the output of multiplier 302 and it is converted to a digital signal by convertor 304, digital-to-analog convertor block 290 is triggered. Thus, the output of digital-to-analog convertor block 290 is an analog representation of the output of the dark pixels of optical scanning device 154. This output is applied to dark level integrator 284 by way of lines 286, 288. Dark level integrator 284 then provides a DC offset adjust signal in accordance with the output of the dark pixel. This DC offset adjust signal is applied by integration output line 282 to summation node 280 in order to clamp the signal from optical scanning device 154 on scanner output line 168 such that the DC offset is zero.

Within analog-to-digital converter 166 the operations of dark reference integration feedback loop 340 are repeated for each scan of optical scanning device 154. Thus, during each scan cycle, the corresponding dark pixel is used to iteratively readjust the DC offset correction by means of summation node 280 or offset correction node 280 in accordance with the output of dark level integrator 284.

In addition to the dark reference pixel provided by optical scanning device 154 during each scan, a white reference pixel is provided during each scan of optical scanning device 154 in order to compensate the whiteness of the image or amplitude of the signal. It will be understood by those skilled in the art that this is necessary because as the speed of conveyor belt 20 increases and the scan rate of optical scanning device increases there is less time for charge to accumulate within optical scanning device 154. This results in a correspondingly lower information amplitude within the video output signal of line 168. Additionally, the user of camera systems 10, 100 may adjust a calibration trimpot (not shown) in order to set a voltage level which is injected into optical scanning device 154 as a white reference pixel. White feedback loop 360 of analog-to-digital converter 166 iteratively corrects for the changing speed and the setting of the trimpot.

When the white reference pixel is applied to analog-to-digital block 304, digital-to-analog block 316 is triggered. This causes an analog representation of the level of the white reference pixel to be applied to summation node 314 by way of lines 326, 328 of block 316. The output of summation node 314 may thus be used for the purpose of providing white reference feedback to the input of analog-to-digital block 304 by way of multiplier 302.

In addition to the analog representation of the amplitude of the white reference pixel of optical scanning device 154, summation node 314 is also acted upon by frequency-to-voltage convertor 324 by way of lines 318, 320. It will be understood by those skilled in the art that variations in the speed of conveyor belt 20 result in signals of varying frequency at the output of belt encoder 152. In order to compensate for the resulting changes in output amplitude from optical scanning device 154 the variable frequency output of belt encoder 152 is applied to frequency-to-voltage convertor 324 by way of encoder output line 153.

Thus, a signal representative of both the white reference pixel and the speed of conveyor belt 20 is applied by summation node 314 to white reference integrator 312. White reference integration feedback loop 360 containing white reference integrator 312 thus may provide an integrated feedback control signal wherein control of integrator 312 is provided according to the current amplitude of the white reference and the speed of conveyor belt 20. This control signal is applied to analog-to-digital block 304 in combination with the input signal and dark reference feedback signal.

In addition to the analog signals provided by digital-to-analog blocks 290, 316, a third analog output signal corresponding to the output of analog-to-digital block 304 is provided within converter 166. This third analog signal appears at the output of digital-to-analog block 330. The analog output signal of digital-to-analog block 330 is provided within analog-to-digital convertor 166 for the purpose of assisting in the detection of concentric ring acquisition targets which may be present on information encoded labels 44.

Thus, the output of digital-to-analog block 330, possibly including electrical signals representing a scanned concentric ring target on label 44, is applied to bandpass filter 332. Bandpass filter 332 of convertor 166 is adapted to pass the frequencies corresponding to a scan of concentric rings by optical scanning device 154. It will be understood that concentric rings at varying distances from optical scanning device 154 are imaged by device 154 with varying amounts of magnification. Thus the corner frequencies of bandpass filter 332 are selected to be those frequencies corresponding to a scan of a target label 44 at the level of conveyor belt 20 and a scan of a target at the maximum height of object 42. Other filtering techniques will he known to those skilled in the art.

The output signal of bandpass filter 332 is applied to threshold comparator 334 which is a one bit analog-to-digital conversion, converting all positive signals to one value and all negative signals to another value. The output of threshold comparator 334 in the preferred embodiment of converter 166 is a substantially binary value which is applied to concentric target detector 180 by way of bus 172. Concentric target detector 180 uses this signal to assist in the detection of a concentric ring acquisition target passing through the field scanned by optical scanning device 154. This signal is usually effective to locate a concentric ring acquisition target to within ±2 pixels.

Figure 8:
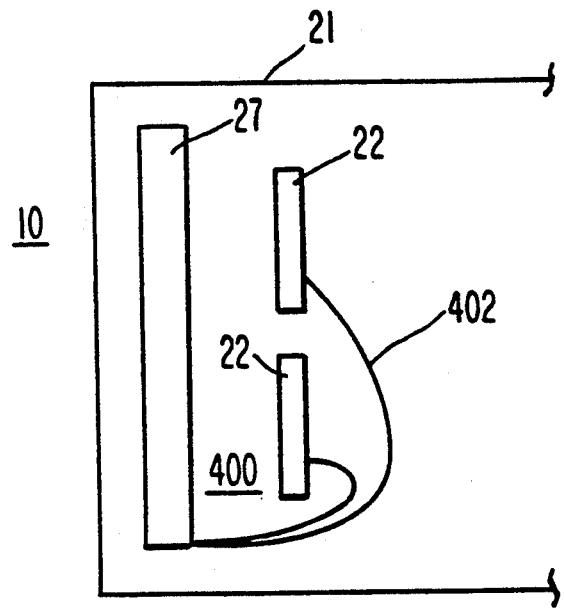
FIG. 8 shows a partial view of the multiple code camera system of FIG. 1 including fiber optic bundles for transmitting light from the illumination source to the optical scanning device for performing a white reference integration.

Referring now to FIG. 8, there is shown white reference feedback system 400 which is used in an alternate embodiment of white reference integration feedback loop 360. White reference feedback system 400 may be used within multiple code camera systems 10, 100 to adjust the white reference seen by integrator 12 within analog-to-digital convection 166 in place of belt speed encoder 152. Additionally however, white reference feedback system 400 may be used to control the amount of illumination provided by illumination sources 15 of illumination system 12 within camera systems 10, 100.

In white reference feedback system 400, a plurality of fiber optic bundles 402 are applied to illumination system 12. Light receiving ends of fiber optic bundles 402 are disposed in the vicinity of each illumination source 15. Light received from each source 15 by respective fiber optic bundles 402 is transmitted by bundles 402 to optical scanning device 154. In order to apply the transmitted light to optical scanning device 154 the light emitting ends of fiber optic bundles 402 are disposed in mirror box 31 substantially close to optical scanning device 154. Thus the transmitted light from each illumination source 15 is applied substantially directly to predetermined pixels of optical scanning device 154 within camera 50.

The predetermined target pixels of optical scanning device 152 receiving the transmitted light from the light emitting ends of fiber optic bundles 402 are dedicated as white references for white reference system 400 used within camera systems 10, 100. Therefore these dedicated pixels are not available to represent information encoded upon label 44 when scanning device 154 reads label 44. The predetermined target pixels may, for example, be the twenty pixels at an end of a scanner having 4,096 pixels within optical scanning device 154. Because individual optical bundles 402 are provided for each illumination source 15 or bulb 15 of illumination system 12, each bulb 15 is prevented from dominating other bulbs 15 due to relative proximity to a common light intensity sensor.

The output signal of pixel data from optical scanning device 154 corresponding to these dedicated pixels may then be used within analog-to-digital converter 166 of parallel architecture 150 to perform the white reference correction of feedback loop 360 as previously described. In this embodiment the light transmitted directly from illumination sources 15 is used to control the integration performed by white integrator 312 in substantially the same manner as that described with respect to the output signal belt encoder 152 on encoder output line 155. It will therefore be understood by those skilled in the art that white integrator 312 may be controlled either in accordance with the light output of bulbs 15 transmitted by fiber optic bundles 402 or in accordance with the speed of conveyor belt 20 as indicated by the output of belt encoder 152.

Figure 9:
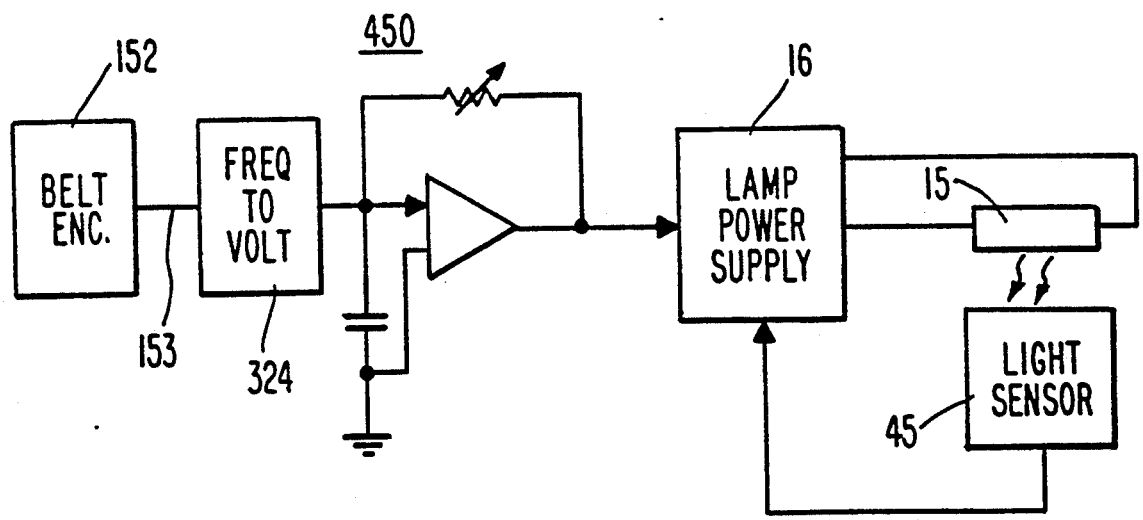
FIG. 9 shows a block diagram representation of a system for controlling the illumination of the camera system of FIG. 1.

Referring now to FIG. 9, there is shown adaptive illumination control system 450. In adaptive illumination control system 450, light sensor 452 senses the amount of light energy emitted by illumination source 15. Light sensor 452 applies a feedback system to lamp power supply 16 according to the sensed light energy. Lamp power supply 16 varies the amount of light energy emitted by illumination source 15 by varying the amount of power applied to illumination source 15.

The amount of power applied by lamp power supply 15 within control system 450 is also controlled according to the speed of conveyor belt 20 as indicated by the frequency of the output of belt speed encoder 15. The output of belt speed encoder 152 is applied to frequency to voltage convertor 324 as previously described in order to provide a control voltage for lamp power supply 16.

Thus in illumination control system 450 control of lamp power supply 16 by belt speed encoder 152 is conditioned by the feedback to lamp power supply 16 from light sensor 452. The feedback from light sensor 452 may be obtained in accordance with reference feedback system 400 wherein fiber optic bundles 402 transmit light energy from illumination sources 15 to optical scanning device 154 and the output of optical scanning device 154 is used to control sources 15 by system processor.

Figure 10:
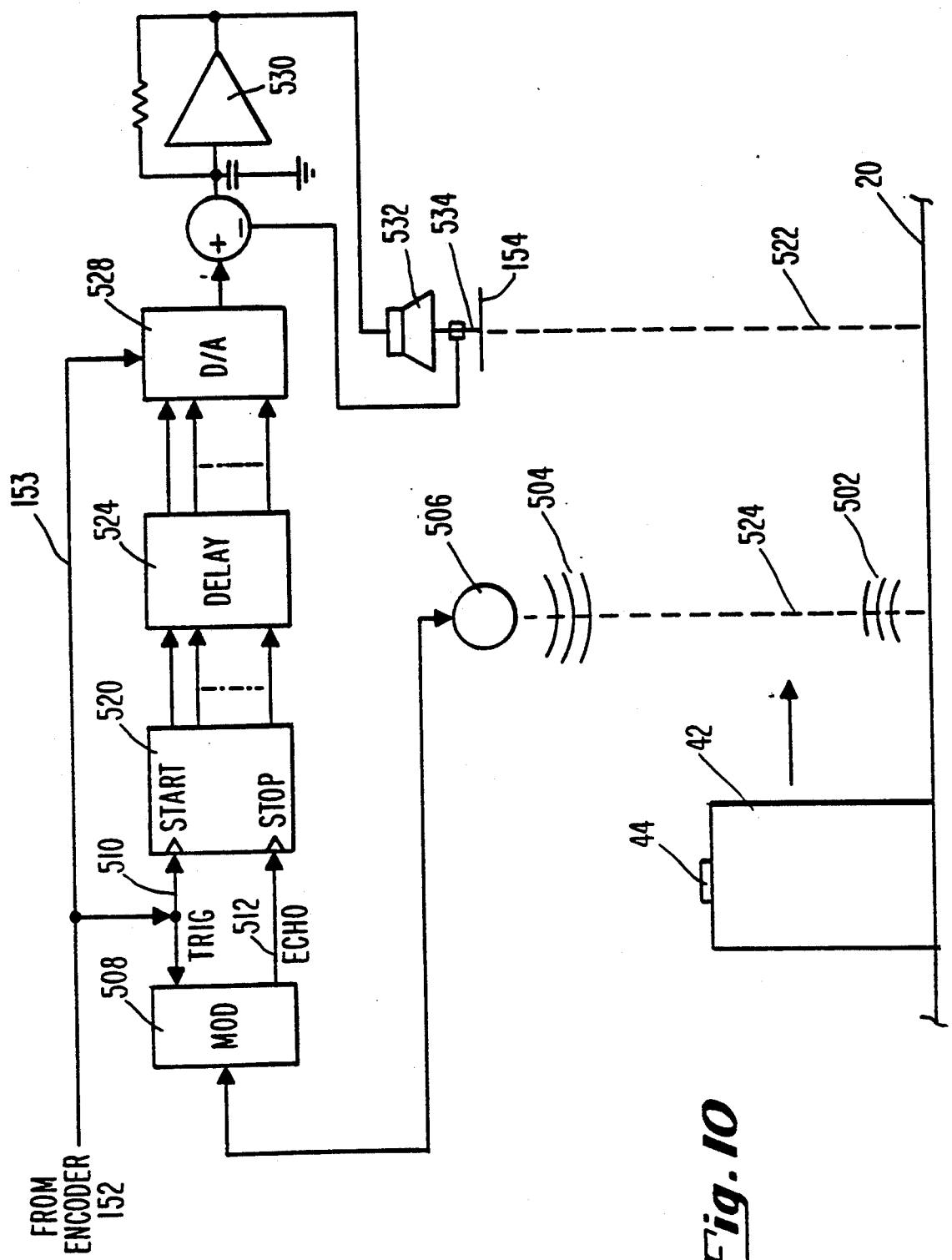
FIG. 10 shows a system for continuously focusing the camera of the multiple code camera system of FIG. 1.

Referring now to FIG. 10, there is shown continuous focus system 500. Continuous focus system 500 may be used to continuously focus camera 50 of multiple code camera systems 10, 100 in real time. Within focusing system 500 the scanning distance between camera 50 and a surface below camera 50 is constantly measured by distance sensor system 506. Distance sensor system 506 is preferably adapted to measure the distance from camera 50 downward to conveyor belt 20 or to the top surface of moving object 42 disposed upon conveyor belt 20.

It will be understood that distance sensor system 506 of continuous focus system 500 may be any conventional sensor system such as an ultrasonic system or an infrared system. Since each ultrasonic distance sensor system 506 may cover, for example, an area of conveyor belt 20 having a diameter of approximately seven inches, several ultrasonic sensors 506 aligned across conveyor belt 20 are required within camera systems 10, 100. Those skilled in the art will understand that ultrasonic sensors are more sensitive to the angle of information-encoded labels 44 in this type of applications.

In continuous focus system 500, distance sensor system 506 emits pulses of, for example, soundwaves 504 in the direction of conveyor belt 20. Soundwaves 504 reflect from the surface of conveyor belt 20 or the top surface of moving object 42 and returning soundwaves 502 travel back to sensor system 506. The pulses of soundwaves 504 of sensor system 506 are initiated by 508 according to a trigger signal applied to mod 508 by way of trigger line 510. The trigger signal of trigger line 510 is controlled according to the output frequency of belt speed encoder 152 by way of encoder output line 153. Thus the timing of the pulses of soundwaves 504 is controlled according to the speed of conveyor belt 20.

It will be understood by those skilled in the art that the amount of time which elapses between the launching of a pulse of soundwaves 504 and the reception of corresponding return soundwaves 502 depends on the distance between sensor system 506 and a surface below it. Thus in addition to emitting soundwaves 504 mod 508 also detects the occurrence of a return soundwaves 502 and provides an echo signal on line 512.

Counter/timer 520 of continuous focus system 500 starts counting when a trigger signal is applied to rood 508 by way of trigger line 510 in accordance with encoder 152 thereby initiating a pulse of soundwaves 504. Counter/timer 520 also receives the echo signal of line 512 from mod 508 when sensor system 506 receives return soundwaves 502. Counter/timer 520 is adapted to begin timing when trigger signal 510 is received and stop counting when echo signal 512 is received. Therefore the count within counter 520 is representative of the time required for a signal to travel from sensor system 506, bounce off a surface, and return to system sensor 506. Thus, the count within counter 520 is representative of the distance between sensor 506 and the surface. Therefore the count within counter 520 is representative of the distance between optical scanning device 154 and camera 50 and the surface.

This distance may then be used by a focusing system to control the focus of camera 50 according to the distance between camera 50 and the surface being scanned by camera 50. This focusing may be performed by any manner known to those skilled in the art. In particular, this focusing may be controlled according to the method taught in the co-pending U.S. Patent Application entitled "Voice Coil Focusing System" filed May 12, 1992, serial number not yet known, which is incorporated by reference herein. In this embodiment of system 500 optical scanning device 154 may travel 0.030 inches under the control of amplifier 530 in order to focus on labels 44 ranging from the level of conveyor belt 20 to thirty-six inches above the level of belt 20.

It will be understood that the use of the count in counter 520 to focus the camera 50 must be delayed according with the distance between camera axis 522 and sensor axis 524 as well as the speed of conveyor belt 20. Therefore in order to delay the use of the count data in counter 520 to control the focus of camera 50 in accordance with the speed of conveyor belt 20, delay element 524 is provided. Delay element 524 may be a conventional first-in first-out block 524 controlled according to the output of belt encoder 152. The delayed output of counter 520 at the output of delay element 524 is then applied to digital-to-analog block 528, filtered and amplified in block 530, and applied to voice coil 532. Voice coil 532 is coupled to optical scanning device 154 by means of rod 534 for displacing optical scanning device 154 according to the output of digital-to-analog convertor 528.

Concentric ring acquisition targets such as those detected by concentric ring detector 180 of parallel architecture 150 are taught in U.S. Pat. No. 4,874,936, entitled "Hexagonal Information Encoding Article, Process and System" and U.S. Pat. Nos. 4,896,029 and 4,998,010, entitled "Polygon Information Encoding Article, Process and System", all three of which issued to Chandler and are incorporated by reference herein. Additionally, detection of the concentric ring acquisition target is taught in U.S. patent application Ser. No. 07/728;219, filed Jul. 11, 1992, entitled "System And Method For Acquiring An Optical Target" by Shaw et al., which is incorporated by reference herein. A method for encoding a concentric ring acquisition target such as that detected by concentric ring detector 180 with multiple resolution information is taught by Chandler in copending U.S. patent application Ser. No. 07/547,755, filed Jul. 2, 1990, which is incorporated by reference herein.

It will be understood that various changes in the details, materials and arrangements of the parts which have been described and illustrated in order to explain the nature of this invention may be made by those skilled in the art without departing from the principle and scope of the invention as expressed in the following claims.

We claim:

1. An optical object scanning system having an optical scanning device for providing a scan output signal including a scan output information portion representative of a scanned region of said object, said scan output information portion having a varying information amplitude, comprising:

illumination source means for illuminating said scanned region of said object;

detection means for receiving light reflected from said scanned region of said object;

white reference means for providing a white reference signal, said white reference means including at least one dedicated pixel for receiving light transmitted from said illumination source means, said at least one dedicated pixel being unavailable for receiving said reflected light from said scanned region of said object; and adjusting means for adjusting said varying information amplitude of said scan output information portion in accordance with said white reference signal.

2. The optical scanning system of claim 1, further comprising means for providing a plurality of said white reference signals.

3. The optical scanning system of claim 2, wherein said optical scanning device has scan cycles further comprising means for providing at least one of said plurality of white reference signals for each of said scan cycles.

4. The optical scanning system of claim 2, wherein said adjusting means comprises means for adjusting said information amplitude in accordance with said plurality of white reference signals.

5. The optical scanning system of claim 4, wherein said optical scanning device has scan cycles and wherein said adjusting means comprises means for adjusting said information amplitude for each of said scan cycles.

6. The optical scanning system of claim 2, wherein said adjusting means comprises integration means for providing an integration signal in accordance with said plurality of white reference signals.

7. The optical scanning system of claim 6, wherein said adjusting means further comprises white reference feedback means for adjusting said information amplitude in accordance with said integration signal.

8. The optical scanning device of claim 7, further comprising means for updating said integration signal and adjusting said information amplitude every scan cycle of said optical scanning device in accordance with said integration signal.

9. The optical scanning system of claim 1, wherein said object moves at varying object speeds further comprising means for providing said white reference signal in accordance with said varying object speeds.

10. The optical scanning system of claim 9, wherein said amplitude adjusting means comprises integrator means for providing an integration signal representative of said varying object speeds.

11. The optical scanning system of claim 1, further comprising:
light transmitting means for transmitting light from said illumination source means; and,
said white reference means including means for receiving said transmitted light and providing said white reference signal in accordance with said transmitted light.

12. The optical scanning system of claim 11, wherein said light transmitting means comprises means for transmitting light to said optical scanning device.

13. The optical scanning system of claim 11, including a plurality of illumination sources each having corresponding light transmitting means, further comprising respective illumination adjusting means for adjusting each illumination source in accordance with its corresponding transmitted light.

14. An optical scanning method in a system including an optical scanning device having scan cycles with an optical scanning rate for providing a scan output signal including a scan output information component having a varying information amplitude representative of light received by said optical scanning device, comprising the steps of:

(a) illuminating a region of an object with illumination source means;

(b) receiving light reflected from said region of said object with detection means;

(c) providing a varying white reference signal with white reference means, said white reference means including at least one dedicated pixel for receiving light transmitted from said illumination source means, said at least one dedicated pixel being unavailable for receiving said reflected light from said region of said object; and, (d) adjusting said varying information amplitude of said scan output information component in accordance with said white reference signal.

15. The optical scanning method of claim 14, comprising the further step of providing a plurality of said white reference signals.

16. The optical scanning method of claim 15, further comprising the step of providing at least one of said plurality of white reference signals for each scan cycle of said optical scanning device.

17. The optical scanning method of claim 15, wherein step (d) comprises the step of adjusting said information amplitude in accordance with said plurality of said white reference signals.

18. The optical scanning method of claim 17, further comprising the step of adjusting said information amplitude each scan cycle of said optical scanning device.

19. The optical scanning method of claim 16, wherein step (d) further comprises integrating by integrator means for providing an integration signal in accordance with said plurality of white reference signals and adjusting said information amplitude in accordance with said integration signal.

20. The optical scanning method of claim 19, further comprising the step of updating said integration signal and adjusting said information amplitude in accordance with said updated integration signal every scan cycle of said optical scanning device.

21. The optical scanning method of claim 14, comprising the further steps of:

(e) moving said object past said optical scanning device at varying object speeds;

(f) providing a velocity signal representative of said varying object speeds; and, (g) providing said varying white reference signal in accordance with said varying object speeds.

22. The optical scanning method of claim 21, wherein step (d) comprises adjusting means in accordance with integrator means for providing an integration output signal representative of said varying object speeds.

* * * * *